US012548537B2

(12) United States Patent
Ramos

(10) Patent No.: US 12,548,537 B2
(45) Date of Patent: Feb. 10, 2026

(54) GUITAR SOUND CONTROL MECHANISM

(71) Applicant: Arturo Ramos, Fremont, CA (US)

(72) Inventor: Arturo Ramos, Fremont, CA (US)

( * ) Notice: Subject to any disclaimer, the term of this patent is extended or adjusted under 35 U.S.C. 154(b) by 265 days.

(21) Appl. No.: 18/320,897

(22) Filed: May 19, 2023

(65) Prior Publication Data

US 2024/0386868 A1 Nov. 21, 2024

(51) Int. Cl.
*G10D 1/08* (2006.01)
*G10D 3/02* (2006.01)
*G10D 3/14* (2020.01)

(52) U.S. Cl.
CPC ................. *G10D 1/08* (2013.01); *G10D 3/02* (2013.01); *G10D 3/14* (2013.01)

(58) Field of Classification Search
CPC .. G10D 1/08; G10D 3/02; G10D 3/14; G10D 1/00; G10D 3/00
See application file for complete search history.

(56) References Cited

U.S. PATENT DOCUMENTS 5,542,329 A * 8/1996 Chen ........................ G10D 3/02
84/294

FOREIGN PATENT DOCUMENTS

CN 217306092 U * 8/2022 ............... G10D 1/08

* cited by examiner

*Primary Examiner* — Kimberly R Lockett
(74) *Attorney, Agent, or Firm* — Cynthia S. Lamon; Lamon Patent Services

(57) ABSTRACT

A tuning system in an acoustic guitar having a guitar body has a dividing panel in the guitar body separating the overall internal volume of the body into a first volume and a second volume, an opening through the dividing panel, a closure element proximate the opening, and a mechanism manually operable from outside the guitar body, adapted to manipulate the closure element from a position of the opening being fully open to a position with the opening fully closed.

7 Claims, 2 Drawing Sheets

GUITAR SOUND CONTROL MECHANISM

BACKGROUND OF THE INVENTION

1. Field of the Invention

The present invention is in the field of musical instruments: specifically in the instant case to acoustic guitars. The present invention relates to the art of tuning or otherwise modifying the quality of the sound output from the instrument.

2. Discussion of the State of the Art

Sound production from most instruments, for example, guitars, may be due to vibration of strings, and vibration of an air column. Tuning typically includes manipulating amplitude which may be defined as maximum displacement of a vibrating particle from its mean or equilibrium position. The loudness or volume of sound depends on amplitude.

The number of vibrations per second is called the frequency. Frequency is measured in hertz (Hz). The pitch of sound depends on its frequency, wherein sounds are higher or lower in pitch according to the frequency being high (880 Hz or low (55 Hz), for example.

Sound produced by any means has the following characteristics: namely, loudness, pitch or shrillness, and quality or timbre.

In the field of acoustic instruments, the art of changing the quality of the sound emanating from an instrument is limited to changing tension in the strings. Tension in the strings affect the output sound's frequency.

A percussion instrument, such as a drum set, typically consists of a combination of cymbals, Toms, snare drums, and a base drum. A typical drum has a batter head and resonant head that are on top and bottom of the drum respectively. The batter head in tension, when hit, vibrates and produces sound. This sound is reverberated by the resonant head. The sound waves between the heads pass through the air column between them.

The sound output of an acoustic guitar the sound output depends to some extent on the volume of the body of the guitar.

What is needed is a sound output mechanism for a guitar enabling more flexibility in the variance of pitch and volume, consistency of sound as well as speed of tuning, even enabling variation while playing the instrument.

BRIEF SUMMARY OF THE INVENTION

In one embodiment of the invention a tuning system in an acoustic guitar having a guitar body is provided, comprising a dividing panel in the guitar body separating the overall internal volume of the body into a first volume and a second volume, an opening through the dividing panel, a closure element proximate the opening, and a mechanism manually operable from outside the guitar body, adapted to manipulate the closure element from a position of the opening being fully open to a position with the opening fully closed.

In one embodiment the dividing panel is parallel with a top and a bottom surface of the guitar. Also, in one embodiment the opening has a specific shape, the closure element has the same shape as the opening, and the closure element is a louver rotatable on a shaft across the opening, the shaft a part of the manually operable mechanism, such that the louver is in the plane of the dividing panel, fully closing the opening, at a right angle to the plane of the dividing panel, with the opening fully open, or in an intermediate position from fully open to fully closed. In one embodiment the specific shape is that of a rectangle for both the opening and the louver. And in one embodiment the system further comprises a plurality of openings and an equal plurality of louvers on shafts across the plurality of openings, the plurality of shafts constrained to turn in unison by gearing coupled to the mechanism operable from outside the body.

In one embodiment of the system the closure element is a panel adapted to slide across the opening, the panel of a size and shape to completely close the opening in one position. And in one embodiment the system further comprises a plurality of openings and an equal plurality of panels adapted to slide across the plurality of openings, the plurality of panels constrained to slide in unison by the mechanism operable from outside the body.

BRIEF DESCRIPTION OF THE DRAWING FIGURES

DETAILED DESCRIPTION

It is well known in the art that size, that is, internal volume of a body of a guitar, has a substantial effect on the sound that results from playing the guitar. A commonly accepted view in the art of impact of size to tonal qualities of an acoustic guitar is that the smaller the body the more treble response and brightness the instrument will have, while a larger body has more potential for bass response. Also, it is generally accepted that large guitars will have a pretty "big" sound while smaller guitars may have a more diminished tone.

Considering these two effects of size, it might be assumed that a bigger body should produce a higher volume response as compared to a smaller one. This is not always true, however, as a smaller body guitar may achieve some disproportionally and surprisingly loud volumes. Not only that, but smaller body types may have a much more balanced range of bass and treble frequencies. This becomes especially important when considering using an acoustic guitar on stage. Without having the extra bass and "woofiness" of a larger body, a smaller guitar will be able to handle feedback a lot better during a live performance. And when taken into consideration that in a studio setting it is much easier to add bass than to remove it, it might be safely assumed that a smaller guitar will most likely provide a cleaner recording over a larger guitar.

All of this having been said, it is still true that a single guitar conventionally has a fixed size and internal volume, so the sound characteristics desired may need to be selected by selecting a guitar of a particular size and volume. An important feature of the present invention is to provide a system to alter and vary the apparent size and internal volume of an acoustic guitar, affording a user a way to change and fine tune the sound characteristics of the guitar in an embodiment of the present invention.

Figure 1:
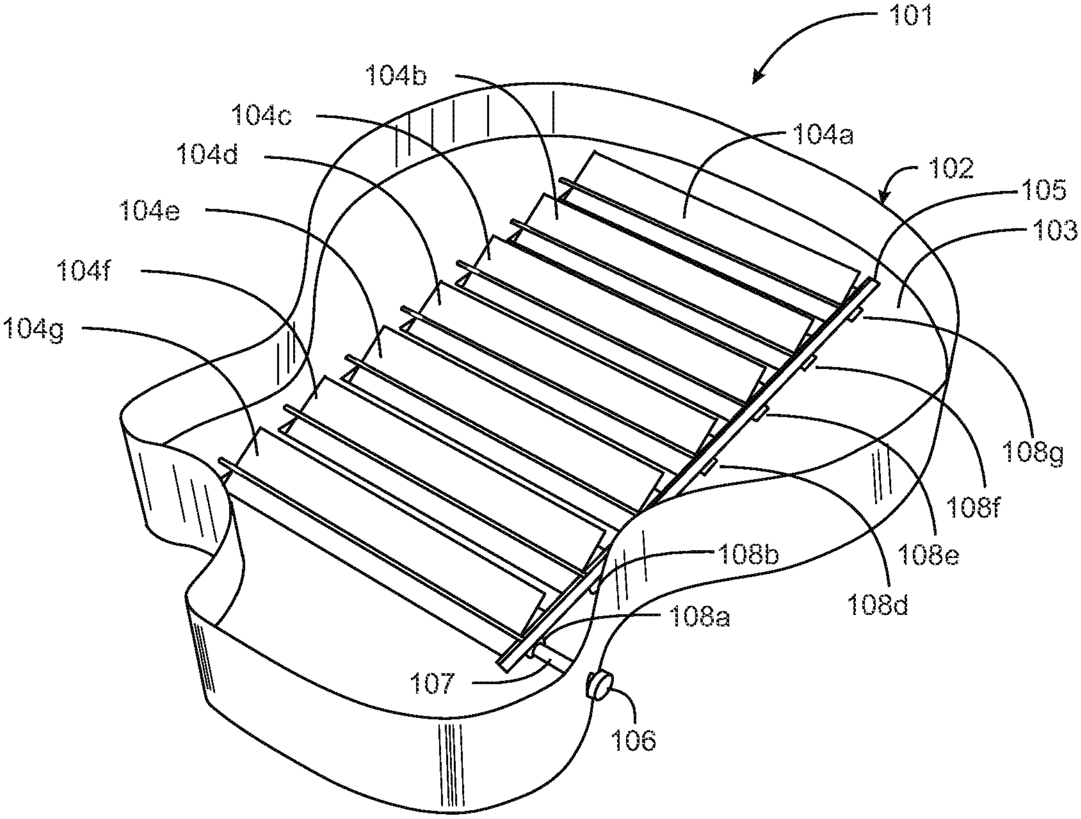
FIG. 1 is an outline diagram of an acoustic guitar in an embodiment of the present invention.

FIG. 1 is an outline diagram of an acoustic guitar 101 in an embodiment of the invention. Guitar 101 in this example has a body 102 that is divided into two internal compartments by a dividing wall 103, that is substantially parallel to a top and a bottom surface of the guitar body. A series of rectangular openings, seven in this example, are closed by louvers 104*a* trough 104*g*, each louver carried on a lengthwise pivot shaft coupled to a gear 108*a* through 108*g*. Gears 108*a* through 108G are each coupled to a gear rack 105 that may be translated in a horizontal plane to rotate gears 108*a* through 108*g*. Gear 108*a* is mounted to a shaft 107 that passes through a side of body 102 to a knob 106 outside the body. A user may rotate knob 106 to turn louver 104*g* and translate rack 105 to turn louvers 104*a* through 104*f* as well in concert with louver 104*g*.

It will be apparent to the skilled person that with all louvers closed the internal volume of body 1002 may be effectively limited to the volume of the upper volume formed by divider 1003. This assumes that the strings of the guitar are on the upper region of the body of FIG. 1. The sound effects of the internal volume may be changed by adjusting the relative opening of all the louvers in unison by turning knob 106 to translate rack 105. The louvers may be opened to any extent desired from closed to fully open.

Figure 2A:
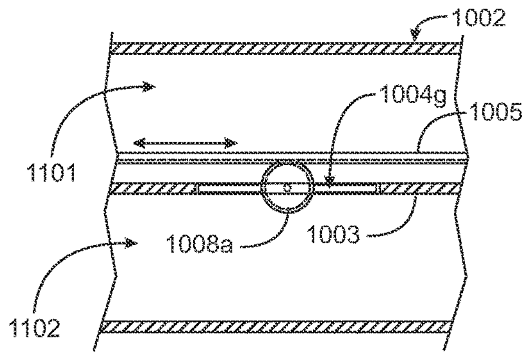
FIG. 2A is a partial section through a guitar in an embodiment of the invention.
Figure 2B:
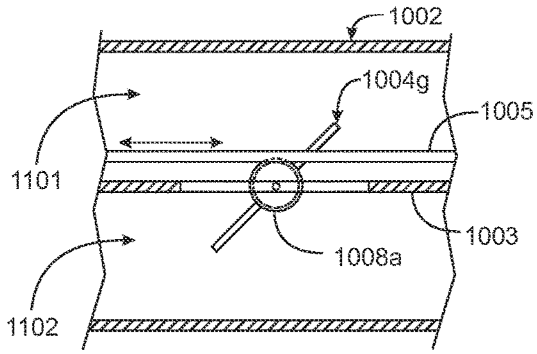
FIG. 2B is another partial section through a guitar in an embodiment of the invention.
Figure 2C:
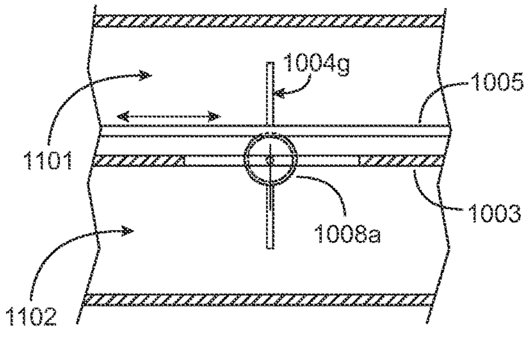
FIG. 2C is yet another partial section through a guitar in an embodiment of the invention.

FIG. 2A is a partial section view through guitar body 102 showing upper and lower volumes 101 and 102, and louver 104*g* in a rotary position such that the opening between the upper and lower volumes is effectively closed. FIG. 2B is a partial section view through guitar body 102 with louver 104*g* in a rotary position approximately at a 45-degree angle, such that that the opening between the upper and lower volumes is only partially blocked. In this intermediary position sound waves and other acoustic effects may be shared between the upper and lower volumes to an intermediate extent. The guitar may perform as a bigger guitar than that of FIG. 2A. FIG. 2C is a partial section view through guitar body 102 showing upper and lower volumes 111 and 112, and louver 104*g* in a rotary position such that the opening between the upper and lower volumes is effectively fully open. The guitar in this circumstance will provide sound effects of a large volume guitar. It is noted that all the louvers are constrained to operate in unison, so in the circumstance of FIG. 2A all louvered openings are closed and in the circumstance of FIG. 2C all the louvered openings are fully open.

It will be evident to the skilled person that there are a limitless number of positions between the louver positions indicated by FIG. 2A and those of FIG. 2C. A user may therefore experiment with effects by varying the position of the louvers by manipulation of knob 106 (FIG. 1), which knob is concentric with gear 108*a* in FIGS. 2A, 2B and 2C. In an acoustic guitar having variable openings according to an embodiment of the invention there are other circumstances that may affect the sound characteristics of the guitar, such as body size, overall volume, nature of the strings, and much more, so the effect of the dual volumes and variable openings between the volumes may require experimentation on the part of a user to understand and exploit the effects.

In an alternative embodiment of the invention openings through divider 103 may be implemented and manipulated in different ways. For example, rather the louvres, one or more sliding panels may be incorporated in dividing wall 103. There may be a plurality of openings and a plurality of mechanisms for moving panels to partially and completely block the openings.

The skilled person will recognize that the embodiments described herein and illustrated in the figures are merely examples of the apparatus and method of use that are within the breadth of the present invention. The invention is limited only by the claims that follow.

What is claimed is:

1. A tuning system in an acoustic guitar having a guitar body having an upper and lower surface thereby providing an inner volume, comprising;

a dividing panel suspended within the guitar body separating the overall internal volume of the body laterally into a first volume and a second volume;

an opening through the dividing panel within the inner volume;

a closure element proximate the opening operable to close the opening; and a mechanism manually operable from outside the guitar body, adapted to manipulate the closure element from a position of the opening being fully open to a position with the opening fully closed and the dividing panel, opening and closure element do not extend outside the walls.

2. The tuning system of claim 1, wherein the dividing panel is parallel with and suspended between the top and bottom surfaces of the guitar and does not extend outside of the top and bottom surfaces.

3. The tuning system of claim 1, wherein the opening has a specific shape, the closure element has the same shape as the opening, and the closure element is a louver rotatable on a shaft across the opening, the shaft a part of the manually operable mechanism, such that the louver is in the plane of the dividing panel, fully closing the opening, at a right angle to the plane of the dividing panel, with the opening fully open, or in an intermediate position from fully open to fully closed.

4. The tuning system of claim 3, wherein the specific shape is that of a rectangle for both the opening and the louver.

5. The tuning system of claim 4, further comprising a plurality of openings and an equal plurality of louvers on shafts across the plurality of openings, the plurality of shafts constrained to turn in unison by gearing coupled to the mechanism operable from outside the body.

6. The tuning system of claim 2 wherein the closure element is a panel adapted to slide across the opening, the panel of a size and shape to completely close the opening in one position.

7. The tuning system of claim 6 further comprising a plurality of openings and an equal plurality of panels adapted to slide across the plurality of openings, the plurality of panels constrained to slide in unison by the mechanism operable from outside the body.

* * * * *